US00RE49593E

(19) United States
(12) Reissued Patent
Chiang et al.

(10) Patent Number: US RE49,593 E
(45) Date of Reissued Patent: Aug. 1, 2023

(54) CASE FOR AN ELECTRONIC DEVICE

(71) Applicant: Speculative Product Design, LLC, San Mateo, CA (US)

(72) Inventors: Randy Yang Chiang, San Mateo, CA (US); Alan Yu Tung Ng, San Francisco, CA (US); Bryan Lee Hynecek, Redwood City, CA (US); Jon Karl Dukerschein, Pacifica, CA (US); Eric Frasch, San Francisco, CA (US); On Yu Wu, Ma On Shan (HK)

(73) Assignee: Speculative Product Design, LLC, San Mateo, CA (US)

(21) Appl. No.: 29/834,052

(22) Filed: Apr. 8, 2022

Related U.S. Patent Documents

Reissue of:
(64) Patent No.: Des. 816,651
Issued: May 1, 2018
Appl. No.: 29/568,292
Filed: Jun. 16, 2016

U.S. Applications:
(62) Division of application No. 29/651,114, filed on Apr. 29, 2020, now Pat. No. Re. 49,021, which is an application for the reissue of Pat. No. Des. 816,651.

(51) LOC (14) Cl. ..... 14-03
(52) U.S. Cl.
USPC ..... D14/250
(58) Field of Classification Search
USPC ..... D3/201, 218, 226, 227, 247, 249, 250, D3/269, 303; D13/103, 107, 108, 119; D14/137, 138 R, 138 AA, 138 C, 138 G, D14/172, 192, 203.3–203.7, 217, 238.1, D14/247, 248, 250–253, 440, 447
CPC ..... A45C 1/06; A45C 2011/002; A45C 11/00; A45F 2005/028; A45F 2200/0525; H04B 1/3888; H04M 1/0202; H04M 1/0283
See application file for complete search history.

(56) References Cited

U.S. PATENT DOCUMENTS

| | | | | | |
|---|---|---|---|---|---|
| D475,696 | S | | 6/2003 | Hussaini et al. | |
| D574,146 | S | | 8/2008 | Eisenbraun | |
| D587,896 | S | * | 3/2009 | Aipa | D3/218 |
| D610,807 | S | * | 3/2010 | Bau | D3/269 |
| D638,006 | S | | 5/2011 | Chang | |
| D638,007 | S | * | 5/2011 | Chang | D14/250 |
| D646,264 | S | * | 10/2011 | Dong | D14/250 |
| D647,517 | S | * | 10/2011 | Fathollahi | D14/250 |
| D648,332 | S | | 11/2011 | Kim et al. | |
| D650,776 | S | * | 12/2011 | Bau | D14/250 |
| D652,825 | S | * | 1/2012 | Bau | D14/238.1 |
| D659,691 | S | * | 5/2012 | Kim | D14/250 |
| 8,204,561 | B2 | | 6/2012 | Mongan et al. | |
| D662,925 | S | | 7/2012 | Mayberry et al. | |
| D670,912 | S | * | 11/2012 | Bau | D3/218 |
| D688,233 | S | * | 8/2013 | Dong | D14/250 |
| D689,851 | S | | 9/2013 | Chang et al. | |
| D690,688 | S | | 10/2013 | Bau | |
| D696,865 | S | | 1/2014 | Morszeck | |
| D706,255 | S | * | 6/2014 | Akana | D14/250 |
| D707,215 | S | * | 6/2014 | Weller | D14/250 |
| D707,670 | S | * | 6/2014 | Chang | D14/250 |
| D709,484 | S | | 7/2014 | Yoo | |
| D716,281 | S | * | 10/2014 | Melanson | D14/250 |
| D716,282 | S | * | 10/2014 | Melanson | D14/250 |
| D716,284 | S | * | 10/2014 | Melanson | D14/250 |
| D716,783 | S | * | 11/2014 | Loncar | D14/250 |
| D717,779 | S | * | 11/2014 | Dong | D14/250 |
| D718,048 | S | | 11/2014 | Hsu | |
| D718,756 | S | * | 12/2014 | Barfoot | D14/250 |
| D721,360 | S | * | 1/2015 | Laffon de Mazieres | D14/250 |
| D724,067 | S | * | 3/2015 | Fathollahi | D14/250 |
| D726,170 | S | * | 4/2015 | Ng | D14/250 |
| D729,252 | S | * | 5/2015 | Smith | D14/440 |
| D729,255 | S | * | 5/2015 | Kilkenny | D14/440 |
| D734,760 | S | | 7/2015 | Brunner et al. | |
| 9,098,238 | B2 | | 8/2015 | Richardson et al. | |
| D746,801 | S | * | 1/2016 | Pan | D14/250 |
| D747,707 | S | * | 1/2016 | Roberts | D14/250 |
| D747,708 | S | * | 1/2016 | Roberts | D14/250 |
| D753,641 | S | * | 4/2016 | Roberts | D14/250 |
| D754,651 | S | * | 4/2016 | Roberts | D14/250 |
| D754,652 | S | * | 4/2016 | Roberts | D14/250 |
| D756,344 | S | * | 5/2016 | Roberts | D14/250 |
| D756,345 | S | * | 5/2016 | Roberts | D14/250 |
| D757,702 | S | * | 5/2016 | Kanazawa | D14/250 |
| D757,704 | S | * | 5/2016 | Roberts | D14/250 |
| D762,200 | S | * | 7/2016 | Pan | D14/250 |
| D762,201 | S | * | 7/2016 | Tseng | D14/250 |

(New)

| | | | | | |
|---|---|---|---|---|---|
| D762,202 | S | * | 7/2016 | Tseng | D14/250 |
| D763,840 | S | * | 8/2016 | Hwang | D14/250 |
| D769,233 | S | * | 10/2016 | Qian | D14/250 |
| D771,607 | S | * | 11/2016 | Kim | D14/250 |
| D772,854 | S | * | 11/2016 | Igarashi | D14/250 |
| D775,615 | S | * | 1/2017 | Tien | D14/250 |
| D776,105 | S | | 1/2017 | Han | |
| D778,271 | S | * | 2/2017 | Stump | D14/250 |
| D780,738 | S | * | 3/2017 | Barfoot | D14/250 |
| D789,347 | S | | 6/2017 | Zamudio | |
| D800,105 | S | | 10/2017 | Roberts et al. | |
| 9,872,546 | B2 | | 1/2018 | Kim | |
| D809,454 | S | | 2/2018 | Zhou et al. | |
| D811,412 | S | | 2/2018 | McCurdy | |
| D812,600 | S | * | 3/2018 | Altaras | D14/250 |
| D812,619 | S | * | 3/2018 | Altaras | D14/440 |
| D816,651 | S | * | 5/2018 | Chiang | H04M 1/185 D14/250 |
| 10,027,783 | B2 | | 7/2018 | Dukerschein et al. | |
| 10,084,502 | B2 | | 9/2018 | Gandhi et al. | |
| D837,194 | S | | 1/2019 | Roberts et al. | |
| 10,383,416 | B2 | | 8/2019 | Hynecek et al. | |
| D861,665 | S | | 10/2019 | Li | |
| D863,278 | S | | 10/2019 | Ravid | |
| D868,765 | S | | 12/2019 | Batta | |
| D879,104 | S | | 3/2020 | Li | |
| D879,760 | S | | 3/2020 | Altschul et al. | |
| D881,895 | S | | 4/2020 | Liu | |
| D889,451 | S | * | 7/2020 | Chiang | D14/250 |
| D889,453 | S | | 7/2020 | Hynecek et al. | |
| D896,212 | S | | 9/2020 | Wang | |
| D912,035 | S | | 3/2021 | Lee | |
| 2009/0107661 | A1 | * | 4/2009 | Andersson | F28F 9/02 165/168 |
| 2010/0096284 | A1 | | 4/2010 | Bau | |
| 2010/0203931 | A1 | | 8/2010 | Hynecek et al. | |
| 2015/0119118 | A1 | * | 4/2015 | Ashley | H04B 1/3888 455/575.8 |
| 2015/0295618 | A1 | | 10/2015 | Johnson et al. | |
| 2016/0157573 | A1 | | 6/2016 | Del Moral et al. | |
| 2017/0187853 | A1 | | 6/2017 | Dukerschein et al. | |
| 2018/0332939 | A1 | | 11/2018 | Chiang et al. | |
| 2019/0081299 | A1 | | 3/2019 | Chiang et al. | |
| 2019/0208878 | A1 | | 7/2019 | Hynecek et al. | |

FOREIGN PATENT DOCUMENTS

WO 2012149304 A1 11/2012

OTHER PUBLICATIONS

Hynecek, B.L. et al., "Case for an Electronic Device," U.S. Appl. No. 29/779,377, filed Apr. 19, 2021, as currently pending.

Android headlines, "Speck Announces Its Case Lineup for the Galaxy S20 Series" Feb. 12, 2020. [online], [retrieved on Mar. 8, 2021]. Retrieved from the internet <URL:<<https://www.androidheadlines.com/2020/02/galaxy-s20-series-speck-cases.html>>>.

CandyShell Grip iPhone 6s Plus Case, posted at speckproducts.com, posting date not given, [online], [site visited Jul. 21, 2017]. Available from Internet, URL: http://www.speckproducts.com/apple/iphonecases/iphone6pluscases/candyshellgripiphone6pluscases/IP6PCSGRIP.html, 7 pages.

Chiang et al., U.S. Appl. No. 29/614,281, filed Aug. 17, 2017, titled "Case for an Electronic Device".

Gear4 Picadilly Clear Case sold by Amazon.com at least as early as Jul. 23, 2018. [online], [retrieved on Mar. 8, 2021]. Retrieved from the internet <URL:< <https://www.amazon.com/Gear4-Piccadilly-Advanced-Protection-Protected/dp/B06Y4KT4MR/ref=sr_1_6?dchild=1&keywords=gear4%2Bpiccadilly%2BCLEAR%2BCASE%2BWITH%2BADVANCED%2BIMPACT%2BPROTECTION%2BROSE%2BGOLD&qid=1615188338&sr=8-6&th=1>>>.

Speck Presidio Clear Case sold by Amazon.com at least as early as Dec. 11, 2017. [online], [retrieved on Mar. 8, 2021]. Retrieved from the internet <URL:<<https://www.amazon.com/Speck-iPhone-Presidio-Clear-Case/dp/B074GM7QQW/ref=sr_1_6?dchild=1&keywords=speck+presidio+clear&qid=1611692305&sr=8-6> >>.

Speck Presidio Perfect Clear Case sold by Amazon.com at least as early as Dec. 10, 2020. [online], [retrieved on Mar. 8, 2021]. Retrieved from the internet <URL:<<https://www.amazon.com/Speck-Products-Presidio-Perfect-Clear-iPhone/dp/B08DKTM8PN/ref=sr_1_2?dchild=1&keywords=speck+presidio+clear&qid=1611692305&sr=8-2>>>.

Speck Presidio Perfect Clear sold by Walmart.com at least as early as Mar. 17, 2020. [online], [retrieved on Mar. 9, 2021]. Retrieved from the internet <URL:<<https://www.walmart.com/ip/Speck-1363715085-Galaxy-S20-Presidio-Perfect-Clear/216610741<<>.

Speck Presidio Show Case sold by Amazon.com at least as early as Oct. 13, 2017. [online], [retrieved on Mar. 9, 2021]. Retrieved from the internet <URL:<<https://www.amazon.com/Speck-Products-Presidio-iPhone-Clear/dp/B074JB61RT/ref=sr_1_1?dchild=1&keywords=presidio%2Bshow%2Bopaque&qid=1611253256&sr=8-1&th=1>>.

Speck Products CandyShell Grip Case, posted at amazon.com, posting date Sep. 20, 2017, [online], [site visited Jul. 21, 2017]. Available from Internet, URL: https://www.amazon.com/SpeckProductsCandyShellGripiPhone/dp/BOOMV77FOA, 10 pages.

Talk Android, "When It Comes To Protecting Your New Galaxy S20, Galaxy S20+, Or Galaxy S20 Ultra, Speck Has Got You Covered," Feb. 14, 2020. [online], [retrieved on Mar. 8, 2021]. Retrieved from the internet <URL:<<https://www.talkandroid.com/guides/buyers-guides/speck-galaxy-s20-plus-ultra-case/>>>.

* cited by examiner

*Primary Examiner* — Darlington Ly
(74) *Attorney, Agent, or Firm* — Lerner David LLP

(57) CLAIM

The ornamental design for a case for an electronic device, as shown and described.

DESCRIPTION

[FIG. 9 is an upper side a top view of the case in accordance with a second embodiment of the invention.]

[FIG. 10 is a rear view of the case in accordance with a second embodiment of the invention.]

Figure 1:
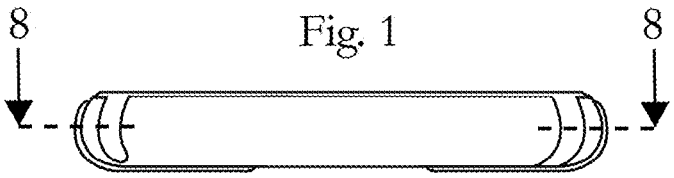
[FIG. 1 is an upper side view of the case in accordance with a first embodiment of the invention.]
Figure 2:
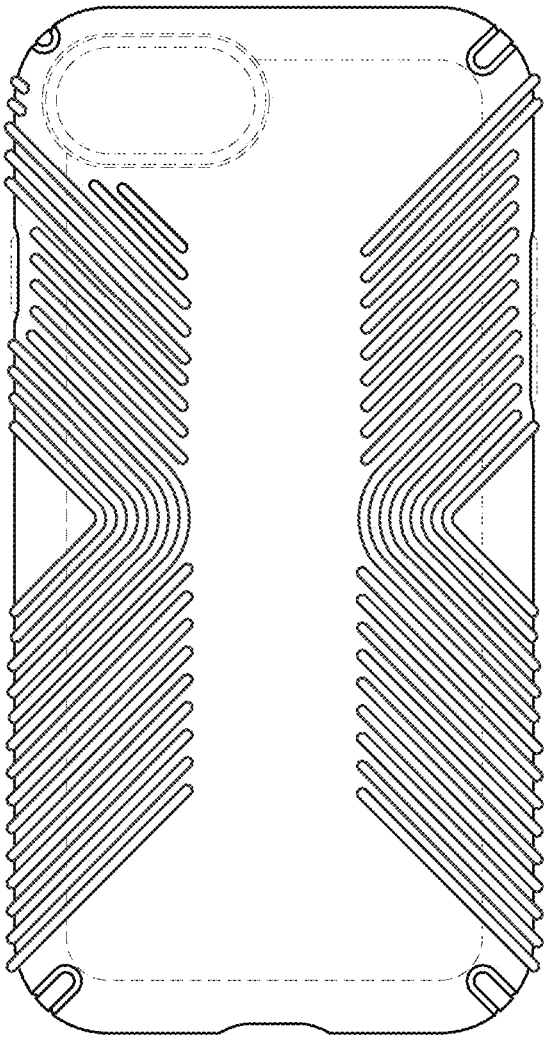
[FIG. 2 is a rear view of the case in accordance with a first embodiment of the invention.]
Figure 3:
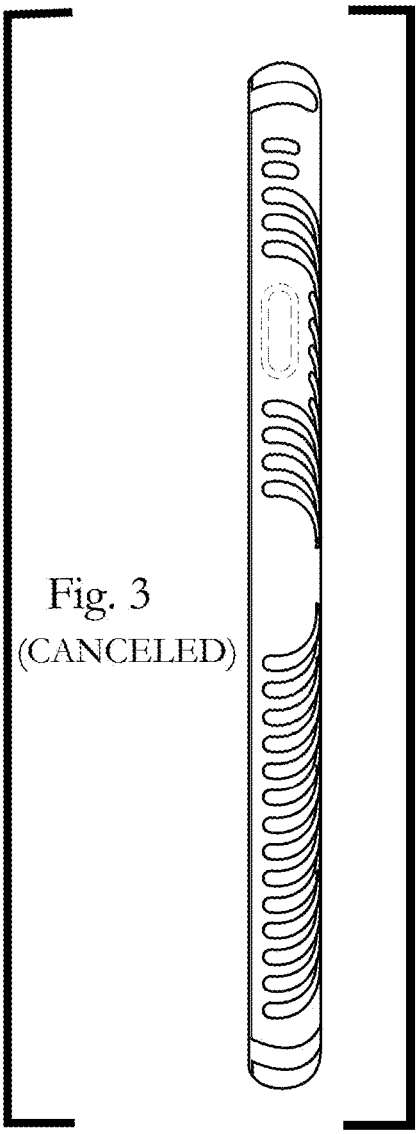
[FIG. 3 is a right side view of the case in accordance with a first embodiment of the invention.]
Figure 4:
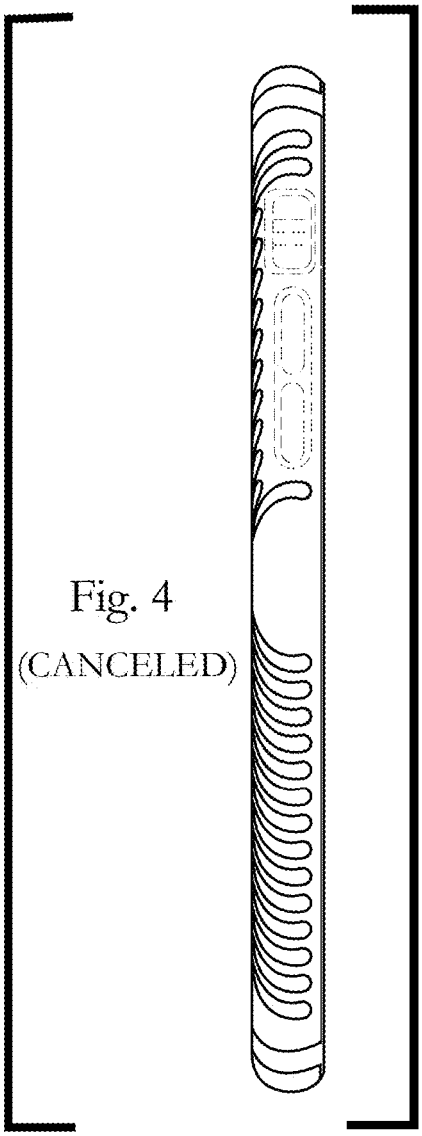
[FIG. 4 is a left side view of the case in accordance with a first embodiment of the invention.]
Figure 5:
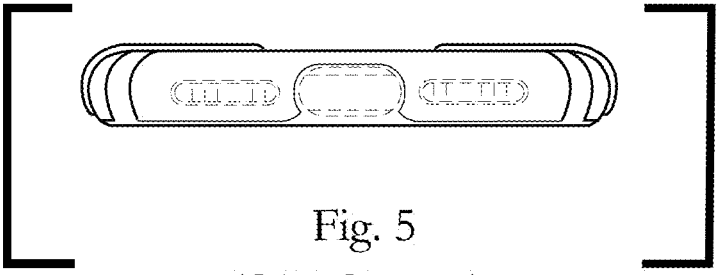
[FIG. 5 is a lower side bottom view of the case in accordance with a first embodiment of the invention.]
Figure 6:
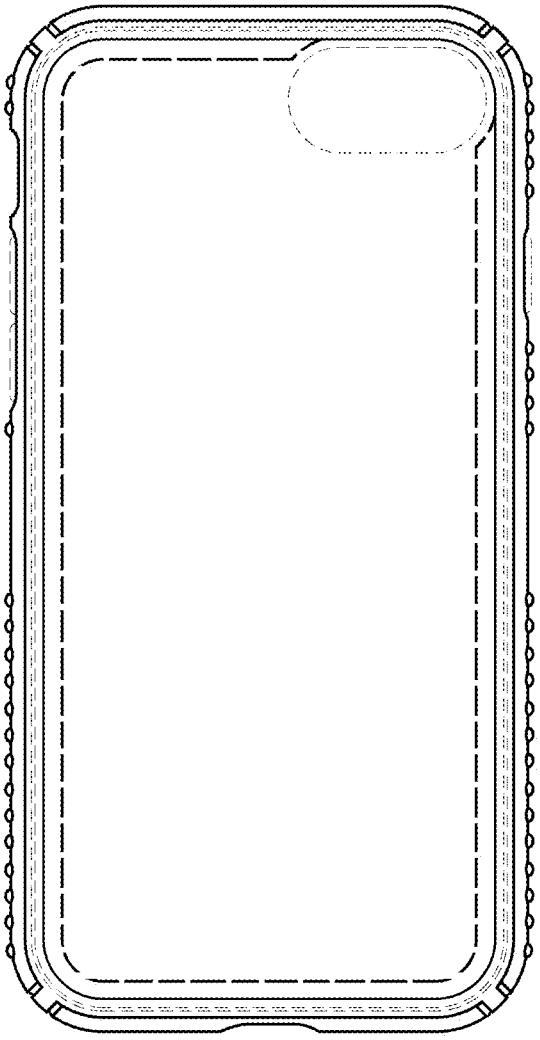
[FIG. 6 is a front view of the case in accordance with a first embodiment of the invention.]
Figure 7:
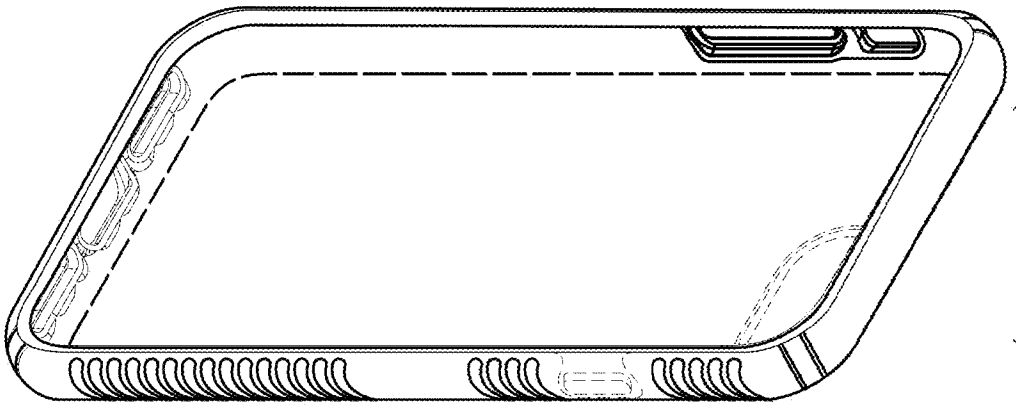
[FIG. 7 is a front-right perspective view of the case in accordance with a first embodiment of the invention.]
Figure 8:
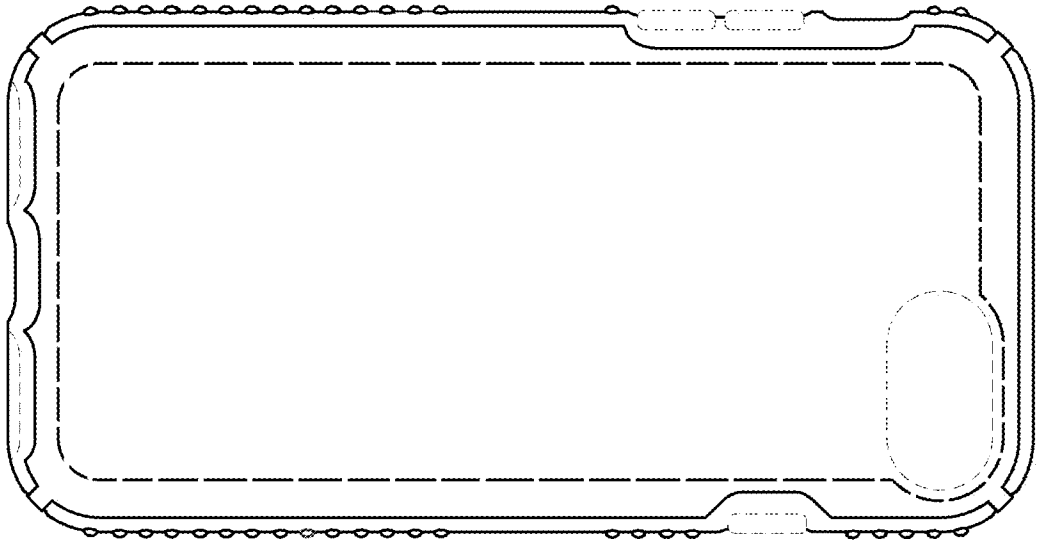
[FIG. 8 is a front-view cutaway of the case in accordance with a first embodiment of the invention.]
Figure 11:
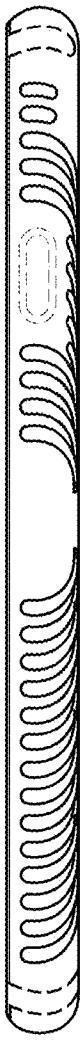
[FIG. 11 is a right side view of the case in accordance with a second embodiment of the invention.]
Figure 12:
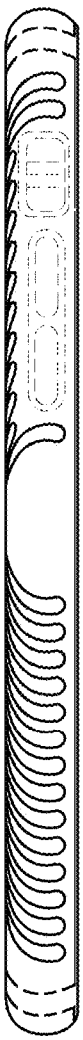
[FIG. 12 is a left side view of the case in accordance with a second embodiment of the invention.]
Figure 13:
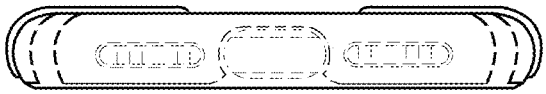
[FIG. 13 is a lower side bottom view of the case in accordance with a second embodiment of the invention.]
Figure 14:
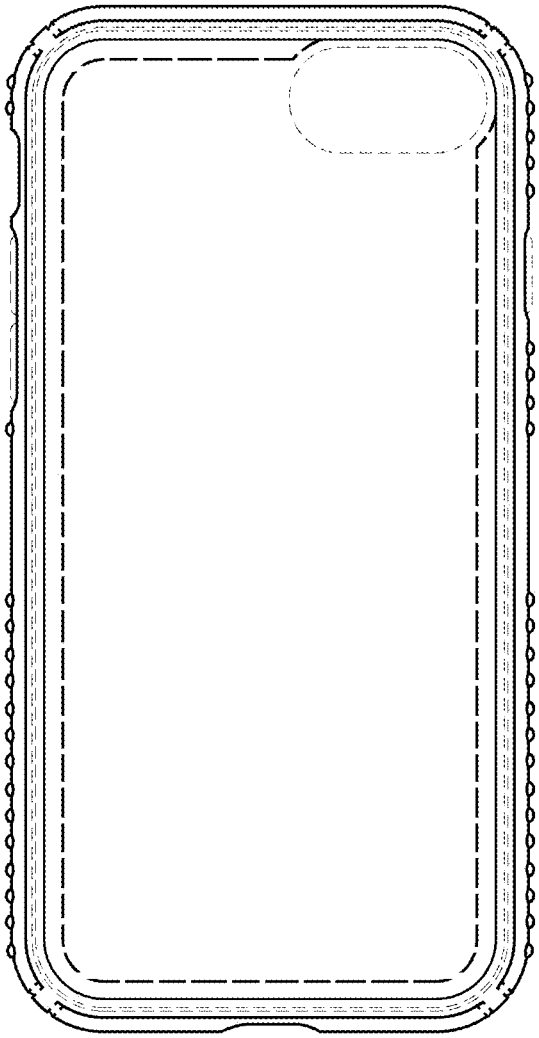
[FIG. 14 is a front view of the case in accordance with a second embodiment of the invention.]
Figure 15:
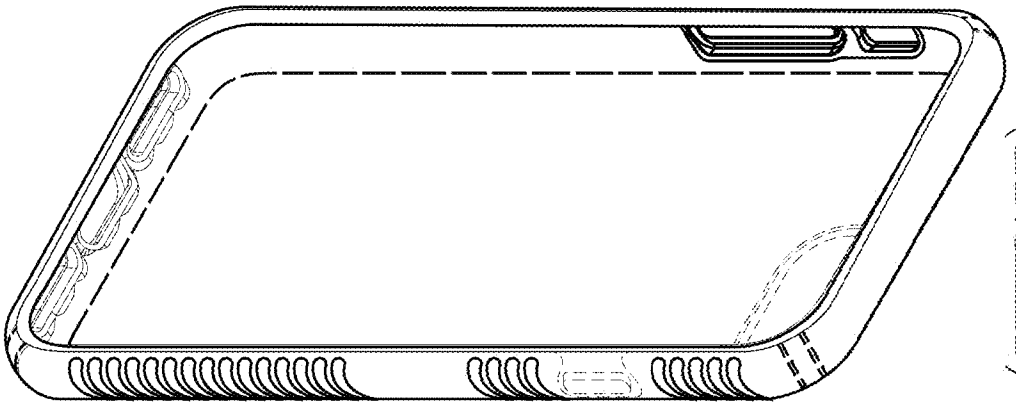
Figure 16:
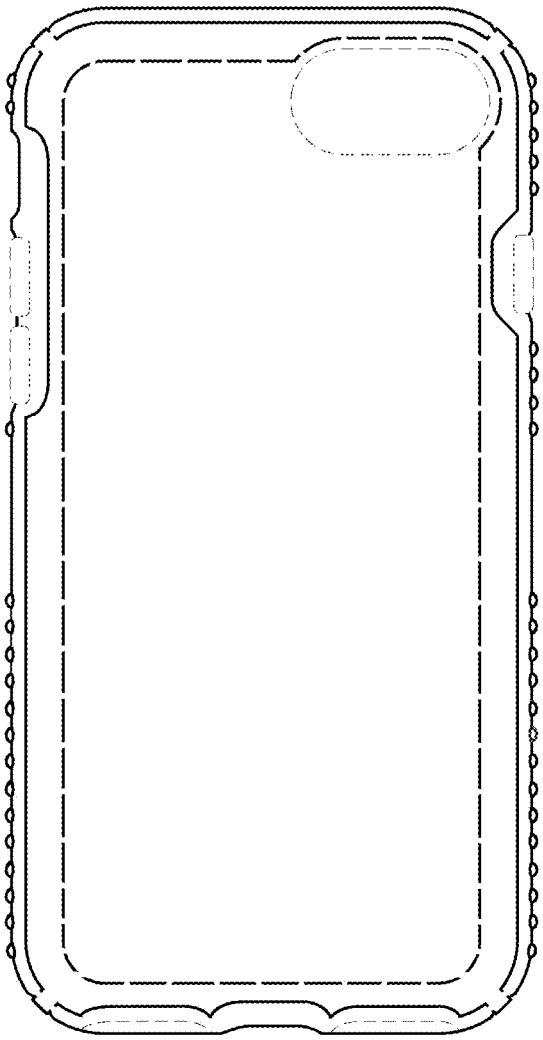

[FIG. 15 is a front-right perspective view of the case in accordance with a second embodiment of the invention.]
[FIG. 16 is a front-view cutaway of the case in accordance with a second embodiment of the invention.]
*FIG. 17 is a top plan view of a case for an electronic device in accordance with the invention;*
*FIG. 18 is a rear elevation view thereof;*
*FIG. 19 is a right side elevation view thereof;*
*FIG. 20 is a left side elevation view thereof;*
*FIG. 21 is a bottom plan view thereof;*
*FIG. 22 is a front elevation view thereof;*
*FIG. 23 is a front-right perspective view thereof; and,*
*FIG. 24 is a cross-sectional view thereof, as taken along line 24-24 in FIG. 17.*
The broken lines shown in the figures are for the purpose of illustrating [structure] *portions of the case for an electronic device* that [forms] *form* no part of the claimed design.

1 Claim, 15 Drawing Sheets

---

Matter enclosed in heavy brackets [ ] appears in the original patent but forms no part of this reissue; matter printed in italics indicates the additions made by reissue.

(CANCELED)

(CANCELED)

(CANCELED)

(CANCELED)

(CANCELED)

(CANCELED)

(CANCELED)

(CANCELED)

(CANCELED)
Fig. 9
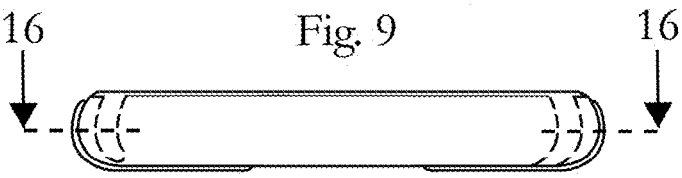
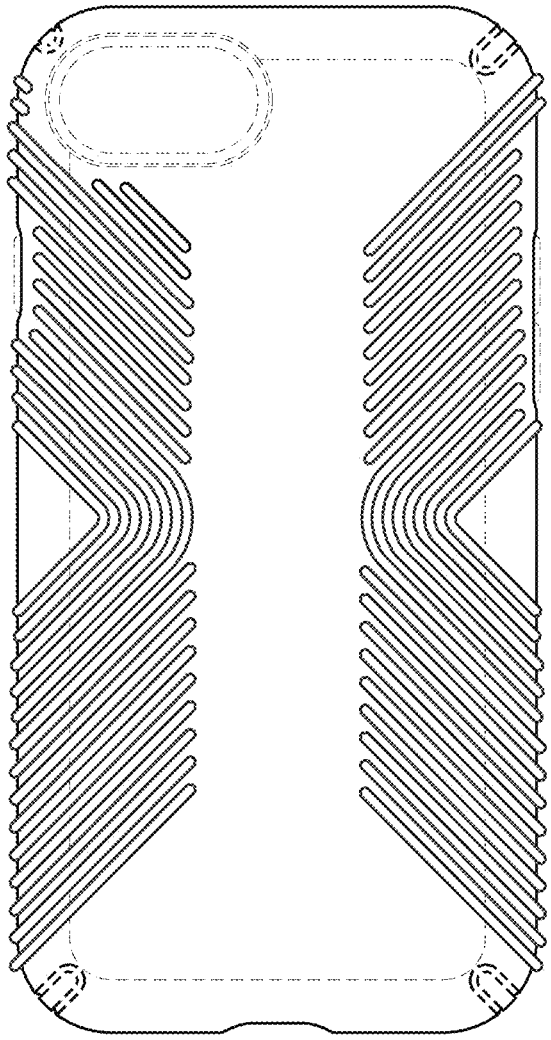
Fig. 10
(CANCELED)

(CANCELED)

(CANCELED)

(CANCELED)

(CANCELED)

(CANCELED)

(CANCELED)

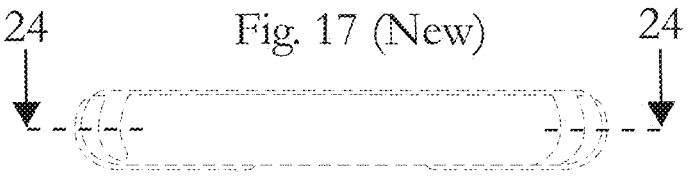
Fig. 17 (New)
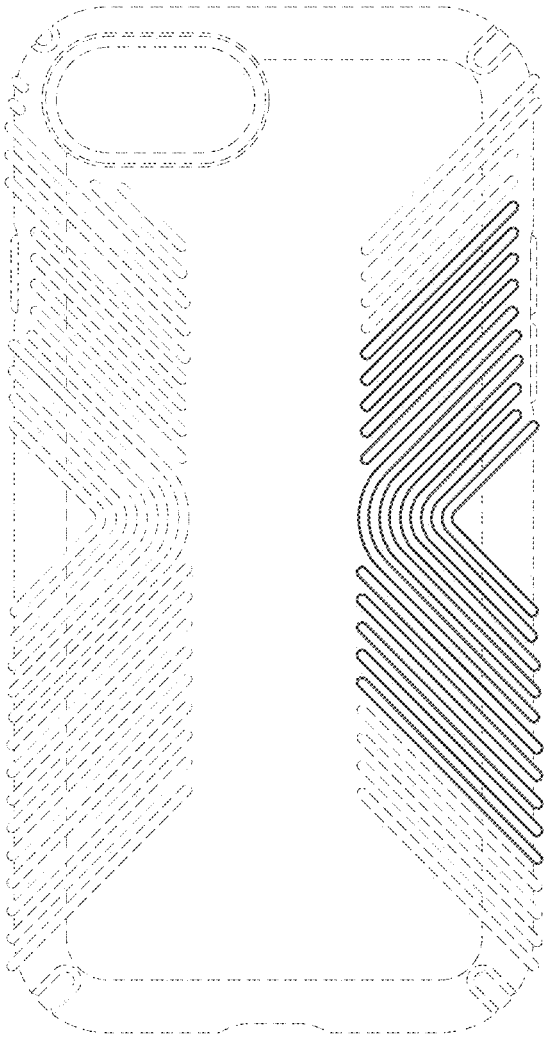
Fig. 18 (New)

Fig. 19 (New)
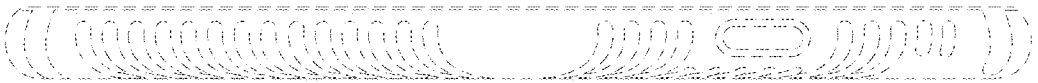
Fig. 20 (New)
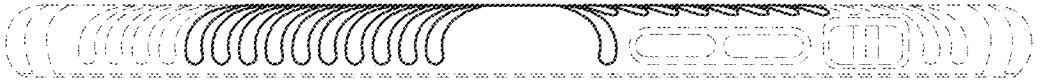
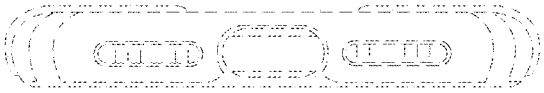
Fig. 21 (New)

Fig. 22 (New)
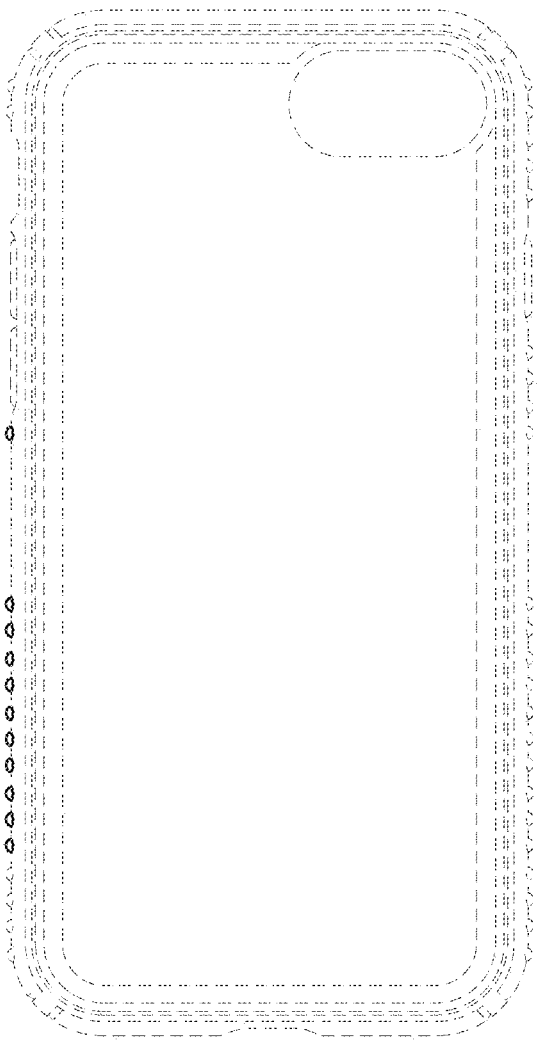

Fig. 23 (New)
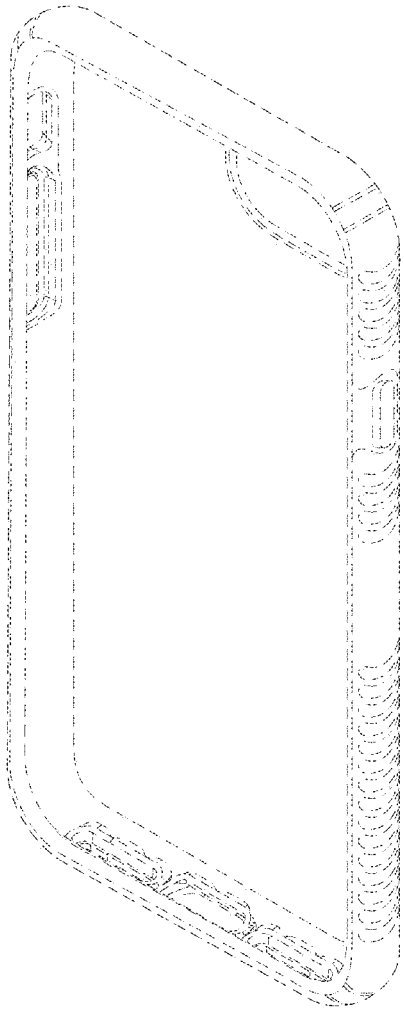

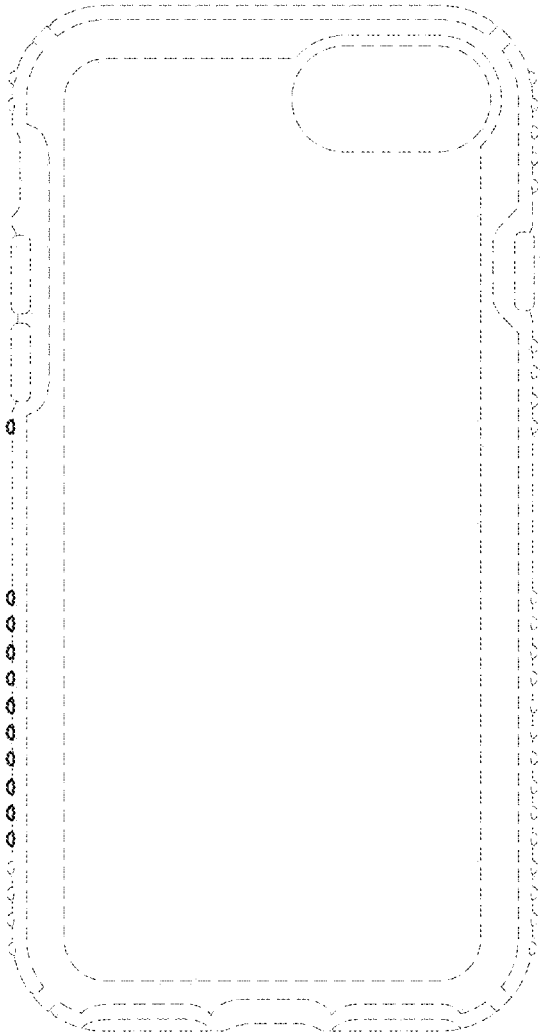
Fig. 24 (New)